US012579756B2

(12) United States Patent
Gurgul et al.

(10) Patent No.: US 12,579,756 B2
(45) Date of Patent: Mar. 17, 2026

(54) GRAPHICAL ASSISTANCE WITH TASKS USING AN AR WEARABLE DEVICE

(71) Applicant: Snap Inc., Santa Monica, CA (US)

(72) Inventors: Piotr Gurgul, Hergiswil (CH); Sharon Moll, Lachen (CH)

(73) Assignee: Snap Inc., Santa Monica, CA (US)

( * ) Notice: Subject to any disclaimer, the term of this patent is extended or adjusted under 35 U.S.C. 154(b) by 560 days.

(21) Appl. No.: 17/947,889

(22) Filed: Sep. 19, 2022

(65) Prior Publication Data

US 2024/0096031 A1     Mar. 21, 2024

(51) Int. Cl.
G06T 19/00     (2011.01)
G02B 27/01     (2006.01)
(Continued)

(52) U.S. Cl.
CPC ........ G06T 19/006 (2013.01); G02B 27/0172 (2013.01); G06T 7/70 (2017.01); G06T 19/20 (2013.01); G06V 10/761 (2022.01); G06V 20/20 (2022.01); G02B 2027/0178 (2013.01); G06T 2219/2004 (2013.01); G06T 2219/2016 (2013.01)

(58) Field of Classification Search
CPC ......... G06T 19/006; G06T 7/70; G06T 19/20; G06T 2219/2004; G06T 2219/2016; G02B 27/0172; G02B 2027/0178; G06V 10/761; G06V 20/20; G06F 3/011
See application file for complete search history.

(56) References Cited

U.S. PATENT DOCUMENTS

| 10,311,833 B1 * | 6/2019 | Qiu | G09G 5/003 |
| 2012/0249544 A1 * | 10/2012 | Maciocci | H04N 9/3173 |
| | | | 345/419 |

(Continued)

FOREIGN PATENT DOCUMENTS

CN     119895358 A     4/2025

OTHER PUBLICATIONS

"International Application Serial No. PCT/US2023/033058, International Search Report mailed Dec. 21, 2023", 4 pgs.

(Continued)

*Primary Examiner* — Edward Park
*Assistant Examiner* — Alexander Joseph Vaughn
(74) *Attorney, Agent, or Firm* — Schwegman Lundberg & Woessner, P.A.

(57)     ABSTRACT

Systems, methods, and computer readable media for graphical assistance with tasks using an augmented reality (AR) wearable devices are disclosed. Embodiments capture an image of a first user view of a real-world scene and access indications of surfaces and locations of the surfaces detected in the image. The AR wearable device displays indications of the surfaces on a display of the AR wearable device where the locations of the indications are based on the locations of the surfaces and a second user view of the real-world scene. The locations of the surfaces are indicated with 3D world coordinates. The user views are determined based on a location of the user. The AR wearable device enables a user to add graphics to the surfaces and select tasks to perform. Tools such as a bubble level or a measuring tool are available for the user to utilize to perform the task.

20 Claims, 16 Drawing Sheets

(51) Int. Cl.

| | |
|---|---|
| *G06T 7/70* | (2017.01) |
| *G06T 19/20* | (2011.01) |
| *G06V 10/74* | (2022.01) |
| *G06V 20/20* | (2022.01) |

(56) References Cited

U.S. PATENT DOCUMENTS

| | | | | |
|---|---|---|---|---|
| 2018/0336732 | A1* | 11/2018 | Schuster | ............... G06T 19/006 |
| 2019/0212901 | A1* | 7/2019 | Garrison | ............... G06F 3/1454 |
| 2020/0257245 | A1* | 8/2020 | Linville | ............... G03H 1/2249 |

OTHER PUBLICATIONS

"International Application Serial No. PCT/US2023/033058, Written Opinion mailed Dec. 21, 2023", 8 pgs.
"International Application Serial No. PCT/US2023/033058, International Preliminary Report on Patentability mailed Apr. 3, 2025", 10 pgs.

* cited by examiner

Figure 2:
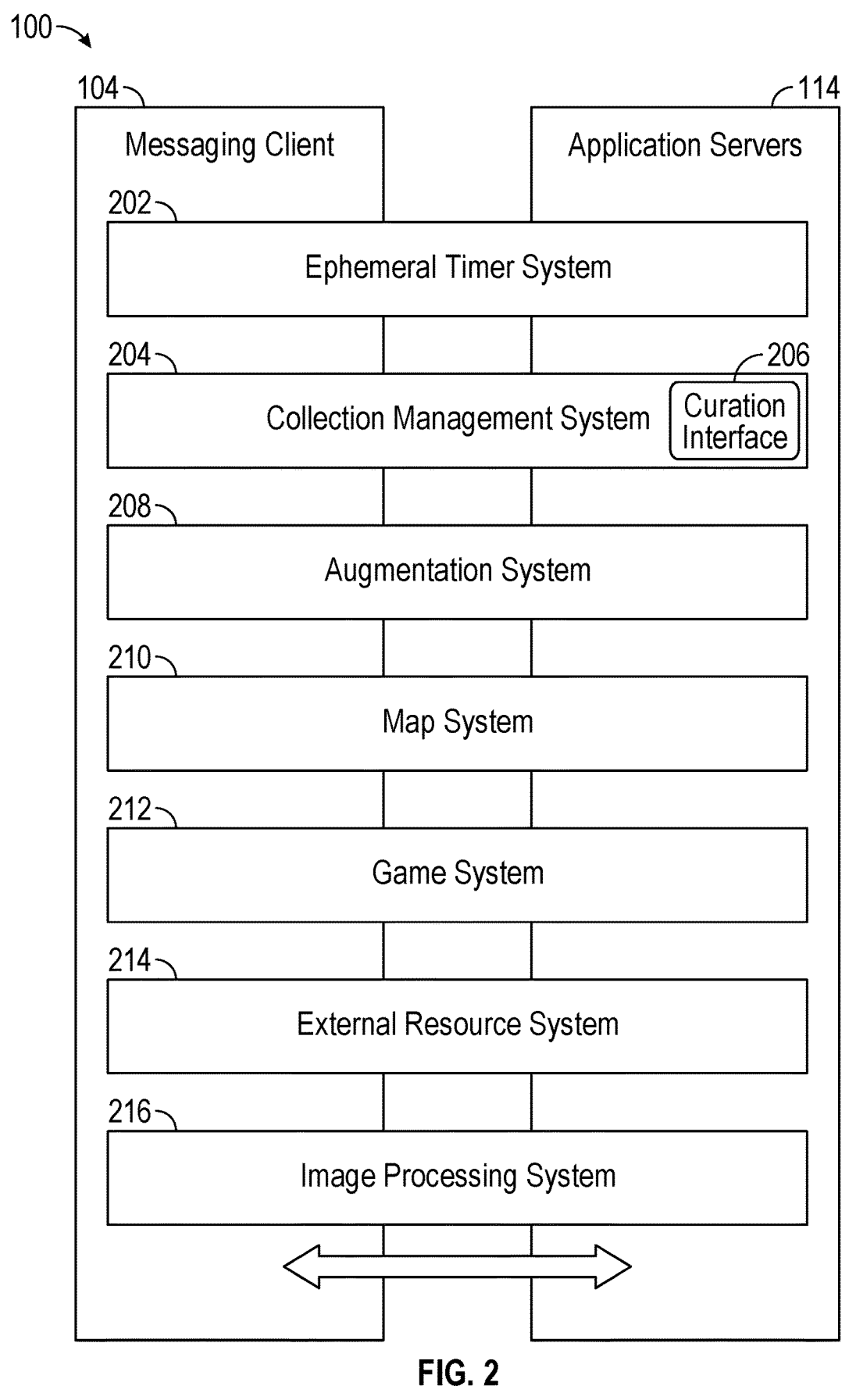

100

104

Messaging Client

114

Application Servers

202

Ephemeral Timer System

204

Collection Management System

206

Curation Interface

208

Augmentation System

210

Map System

212

Game System

214

External Resource System

216

Image Processing System

Figure 13:
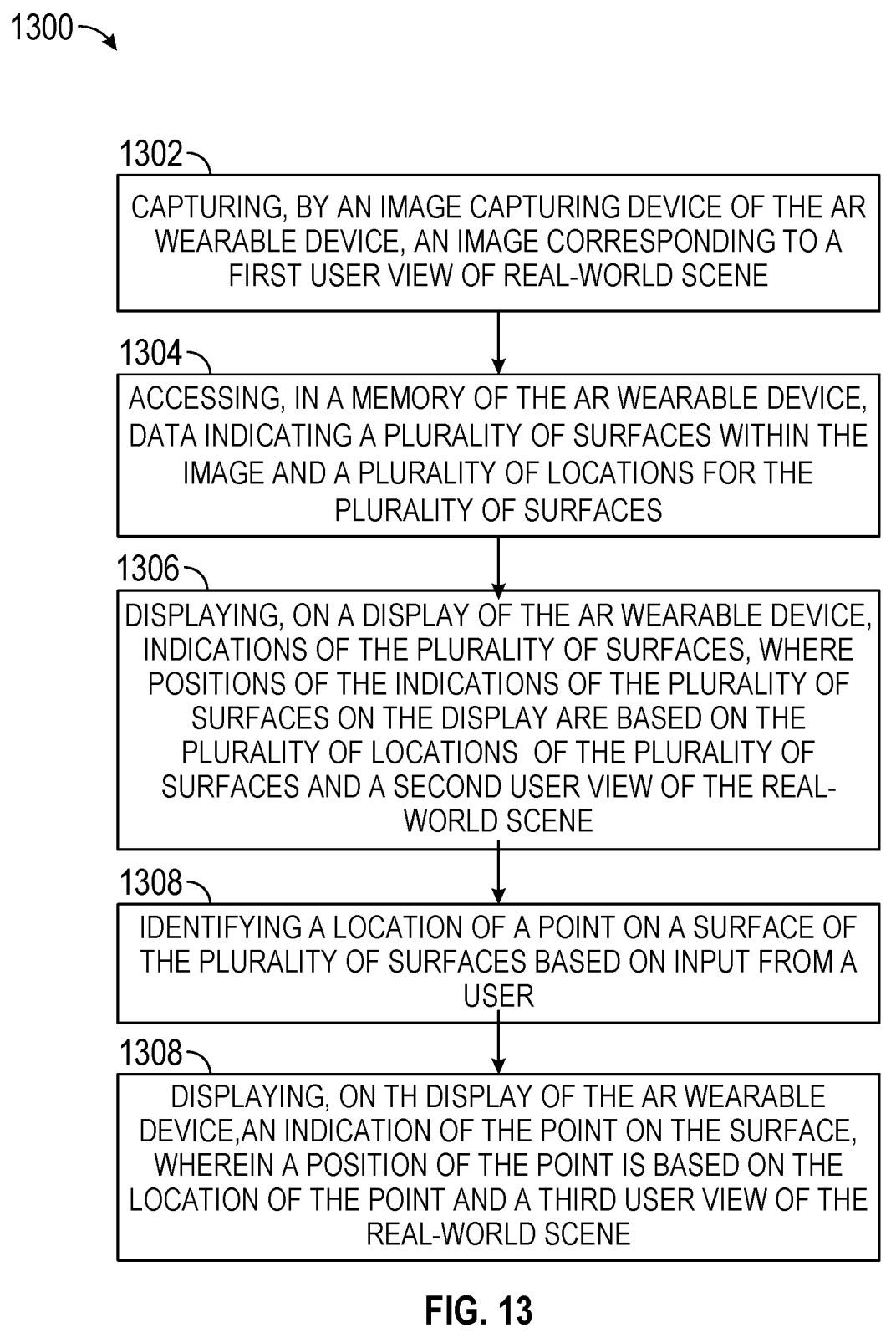

> CAPTURING, BY AN IMAGE CAPTURING DEVICE OF THE AR WEARABLE DEVICE, AN IMAGE CORRESPONDING TO A FIRST USER VIEW OF REAL-WORLD SCENE

1304 ⟍

> ACCESSING, IN A MEMORY OF THE AR WEARABLE DEVICE, DATA INDICATING A PLURALITY OF SURFACES WITHIN THE IMAGE AND A PLURALITY OF LOCATIONS FOR THE PLURALITY OF SURFACES

1306 ⟍

> DISPLAYING, ON A DISPLAY OF THE AR WEARABLE DEVICE, INDICATIONS OF THE PLURALITY OF SURFACES, WHERE POSITIONS OF THE INDICATIONS OF THE PLURALITY OF SURFACES ON THE DISPLAY ARE BASED ON THE PLURALITY OF LOCATIONS OF THE PLURALITY OF SURFACES AND A SECOND USER VIEW OF THE REAL-WORLD SCENE

1308 ⟍

> IDENTIFYING A LOCATION OF A POINT ON A SURFACE OF THE PLURALITY OF SURFACES BASED ON INPUT FROM A USER

1308 ⟍

> DISPLAYING, ON TH DISPLAY OF THE AR WEARABLE DEVICE,AN INDICATION OF THE POINT ON THE SURFACE, WHEREIN A POSITION OF THE POINT IS BASED ON THE LOCATION OF THE POINT AND A THIRD USER VIEW OF THE REAL-WORLD SCENE

┌─ 1404
Processors ┌─ 1408

Processor
┌─ 1410
Instructions

┌─ 1412
Processor
┌─ 1410
Instructions

┌─ 1406
Memory
1414 ─┐     ┌─ 1416
Main Memory    Static Memory
1410 ─┐     ┌─ 1410
Instructions     Instructions

Storage Unit
┌─ 1420
Machin-Readable Medium
┌─ 1410
Instructions

└─ 1418

┌─ 1440
Bus

┌─ 1402
I/O Components

1426 ─┐    1428 ─┐    1430 ─┐
User Output    User Input    Biometric

1432 ─┐    1428 ─┐    1436 ─┐
Motion    Environment    Position

┌─ 1438
Communication

┌─ 1424
Device

┌─ 1422
Network

GRAPHICAL ASSISTANCE WITH TASKS USING AN AR WEARABLE DEVICE

TECHNICAL FIELD

Examples of the present disclosure relate generally to assisting users with tasks using augmented reality (AR) graphics on AR wearable devices. More particularly, but not by way of limitation, examples of the present disclosure relate to capturing an image of a scene, processing the image to identify surfaces within the scene, and assisting a user with a task by enabling the user to add AR user graphics to the surfaces and providing tools to manipulate the AR user graphics.

BACKGROUND

Users increasingly want virtual reality (VR), mixed reality (MR), and augmented reality (AR) wearable devices to operate in a more user-friendly manner with more functions. However, often, the wearable devices have very little room for interface controls on the wearable devices and often the AR wearable devices have limited power to provide additional functions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 2 is a diagrammatic representation of a messaging system, in accordance with some examples, that has both client-side and server-side functionality.

FIG. 12 is a perspective view of a wearable electronic device in the form of glasses 1200, in accordance with some examples.

FIG. 13 illustrates a method for graphical assistance with tasks using an AR wearable device, in accordance with some examples.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term AR wearable device is used as an illustrative device; however, one skilled in the art will recognize that the methods, systems, and computer readable medium disclosed herein are applicable to other wearable devices including VR wearable device and MR wearable devices.

Figure 6:
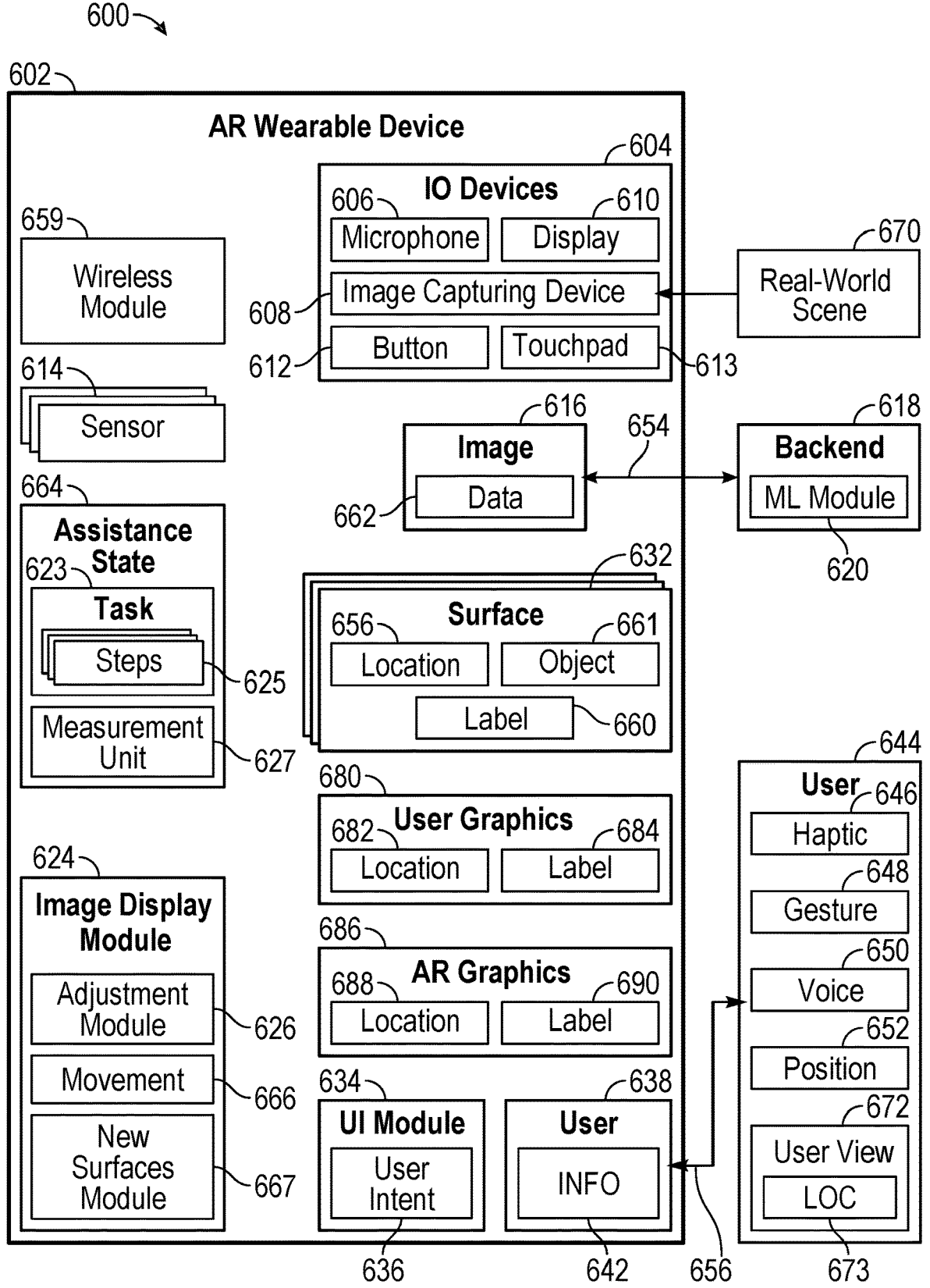
FIG. 6 illustrates a system for graphical assistance with tasks using an AR wearable device, in accordance with some examples.
Figure 12:
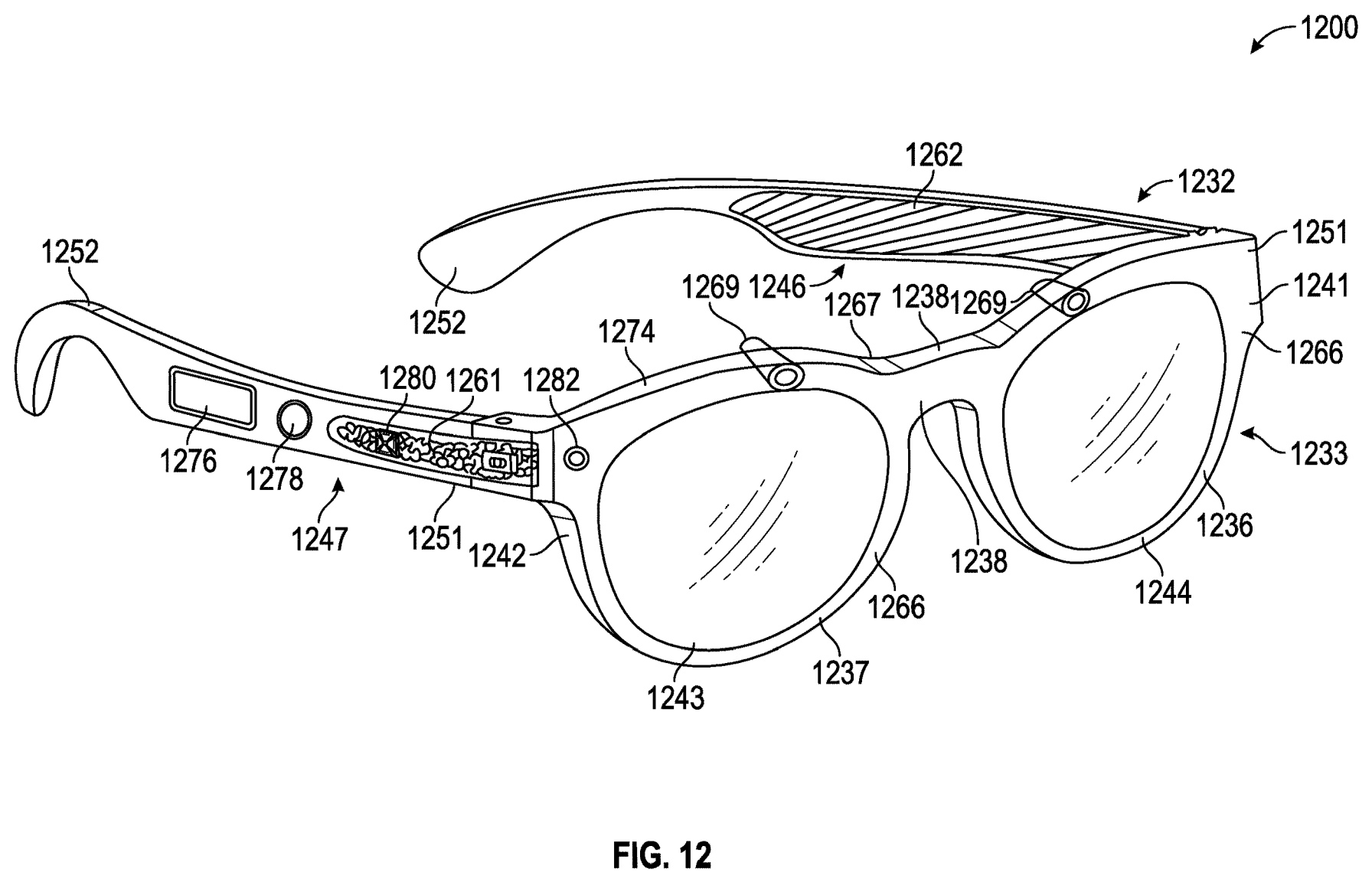

The AR wearable devices 602 of FIG. 6, such as AR glasses 1200 shown in FIG. 12, have limited physical user interface items. For example, AR glasses 1200 have one or two buttons 1278 and a touchpad 1276 that the user 644 interacts with on a frame 1232 of the AR glasses 1200. Moreover, the AR glasses 1200 are limited to battery power.

Often a user 644 while wearing AR glasses 1200 would like to accomplish a task 623 such as hanging a real-world painting. The task 623 can be frustrating because the user 644 may have to use measuring devices, levels, and a pencil to hang the painting. Additionally, a user 644 often needs both of their hands to perform the task 623 so the use of a client device 102 may be awkward.

One challenge is how to assist a user in performing a task. The challenge is addressed by identifying surfaces 632 within a user view 672 of a real-world scene 670 and identifying the surfaces 632 to the user 644 with AR graphics 686 such as an overlay. The user 644 can then select a task 623 and can interact with the surfaces 632. The AR glasses 1200 provide hands free operation so that the user 644 can perform tasks 623 that require two hands to perform.

Additional challenges include how to reduce the latency in providing the graphical assistance to the user 644 and how to reduce energy consumption. The challenges are addressed by sending the images 616 to a backend 618 to perform the processing to determine the surfaces 632, in accordance with some embodiments. And, performing other assistance functions on the AR wearable device 602 such as placing holes for hanging a painting. In this way, some of the high-energy processing can be performed by a backend 618 and other lower-energy processing can be performed by the AR wearable device 602. Moreover, the latency can be reduced for interactions with the user 644. The challenges are additionally addressed by the AR wearable device 602 receiving from the backend 618 locations 656 of the surfaces 632 in a 3-D world coordinate system. The AR wearable device 602 uses the locations 656 and a new user view 672 to update the AR graphics 686 when a user 644 moves. Moreover, the AR wearable device 602 refrains from sending additional images 616 to the backend 618 for processing unless the user view 672 includes new surfaces 632. In some embodiments, some or all of the image 616 processing is performed on the AR wearable device 602.

Networked Computing Environment

Figure 1:
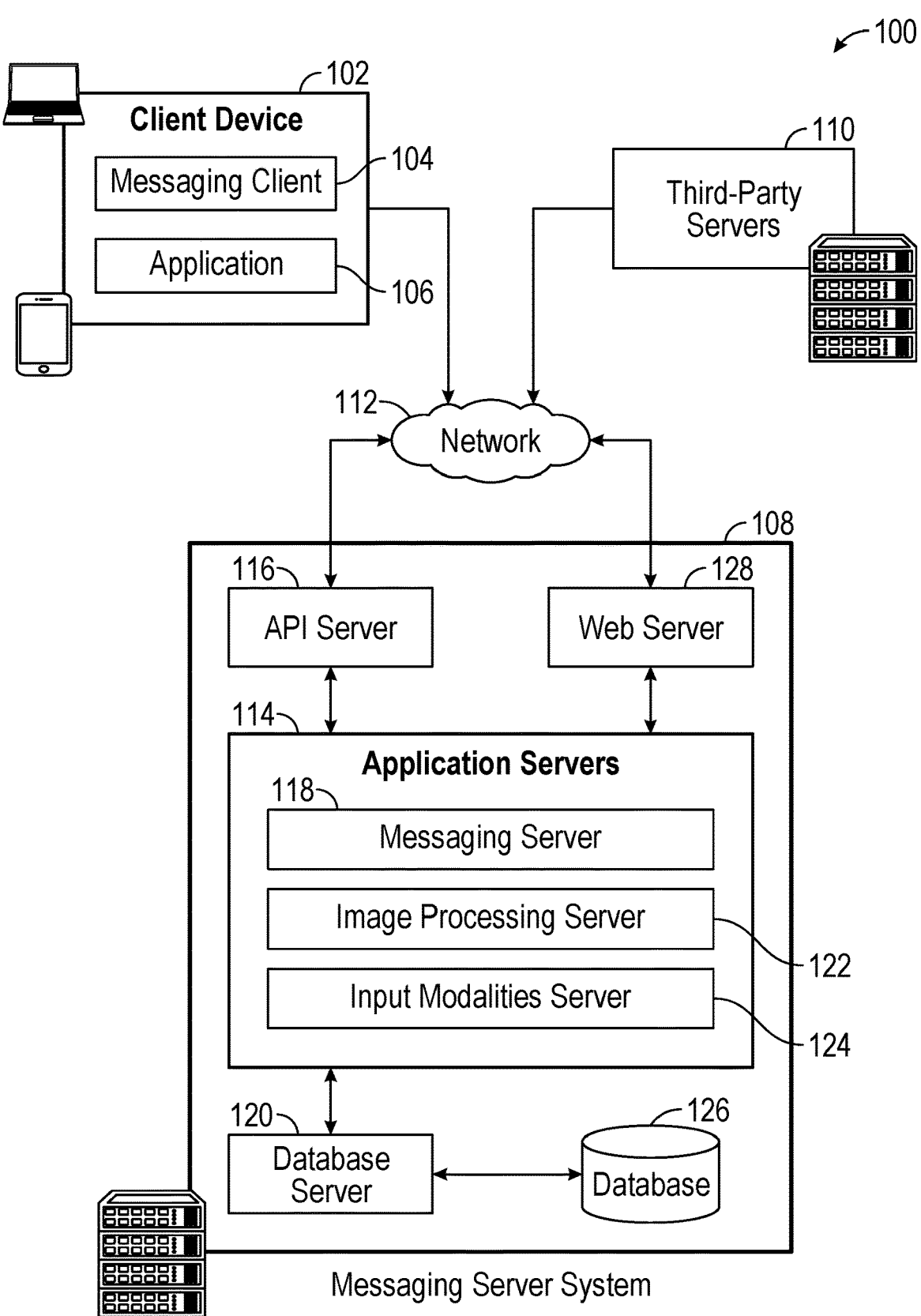
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and an input modalities server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The input modalities server 124 supports input modalities for AR wearable devices. The input modalities server 124 receives requests from an AR wearable device and responds to the requests. The requests include sensor data such as an image being sent to the input modalities server 124 for processing. The input modalities server 124 processes the sensor data and identifies objects within the sensor data and returns names of the objects and positions of the objects within the sensor data to the AR wearable device. Another request from the AR wearable device is for AR applications associated with tags such as "QR code" that may be run on the AR wearable device. The input modalities server 124 may load the AR wearable device with AR applications that are likely to be used by a user of the AR wearable device or respond with AR applications based on criteria given to the input modalities server 124 from the AR wearable device. The criteria may be as a limit on the number of AR applications, preferences of the user such as AR applications with links back to the messaging system 100, and so forth.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an image processing system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client

104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The image processing system 216 supports system 600 for AR wearable devices. The image processing system 216 receives requests from an AR wearable device 602 and responds to the requests. The requests include a request to process images such as image 616 to generate data 662 that includes surfaces 632 as described in conjunction with FIG. 6. AR wearable devices may request other services from the image processing system 216.

Data Architecture

Figure 3:
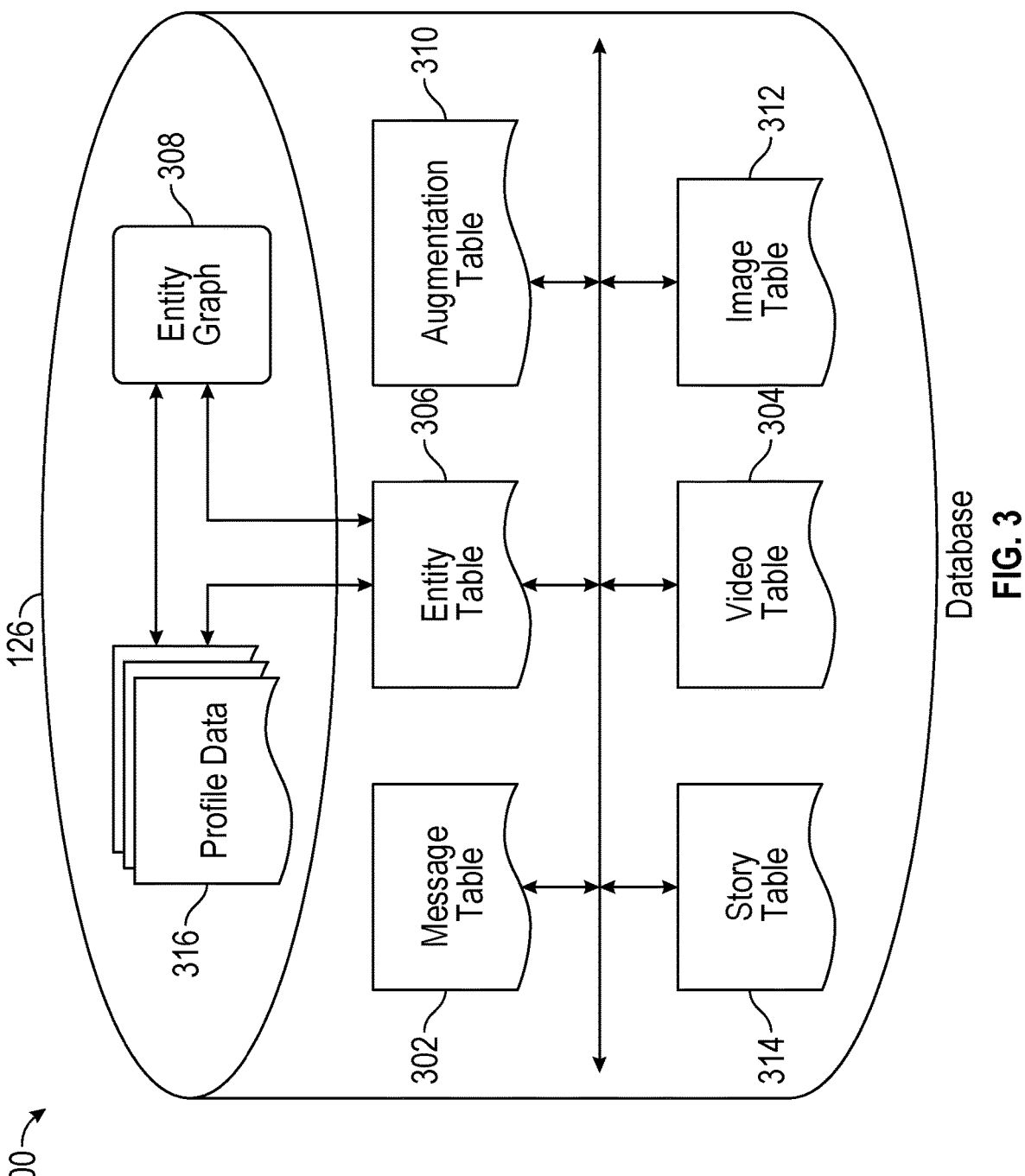
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
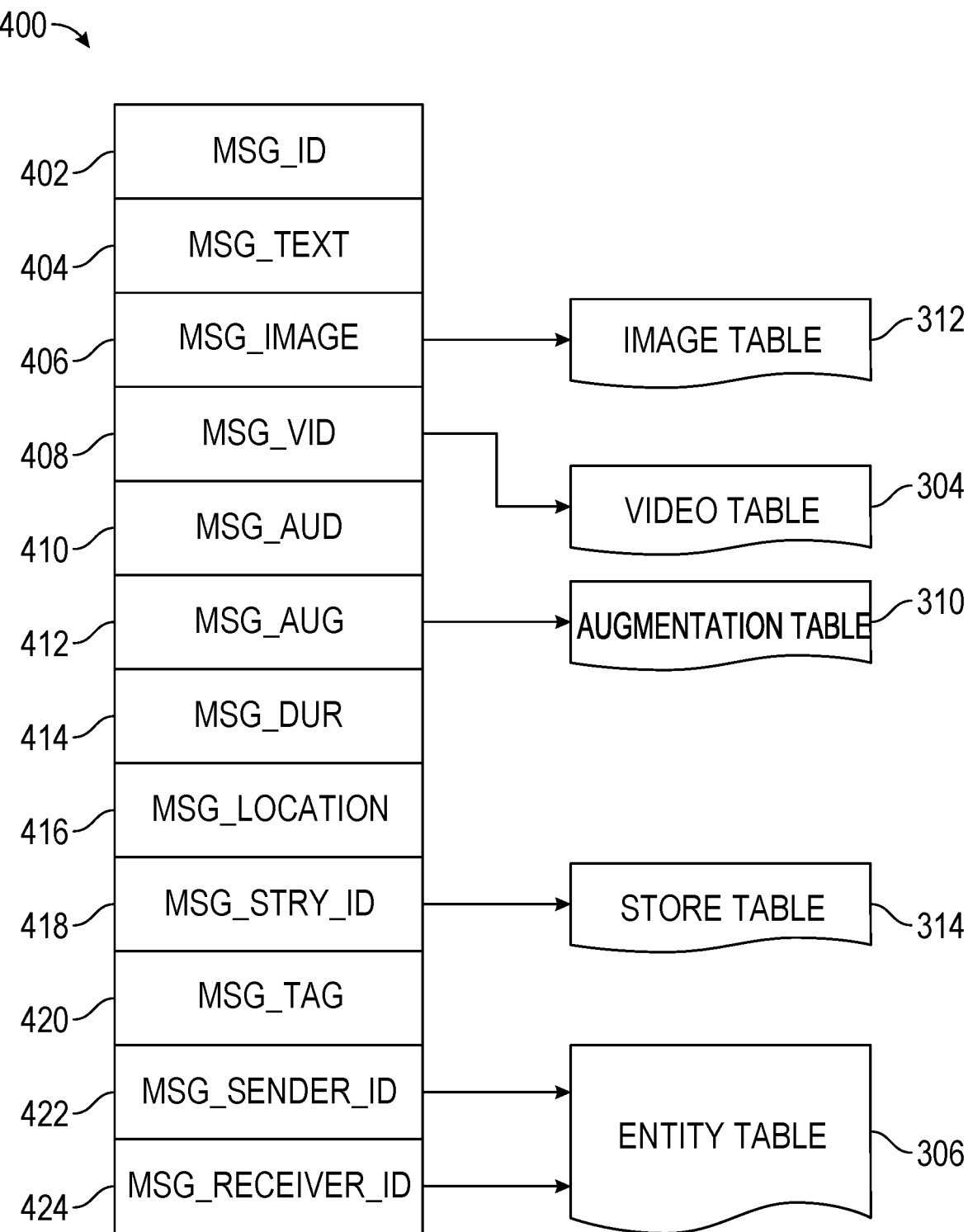
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
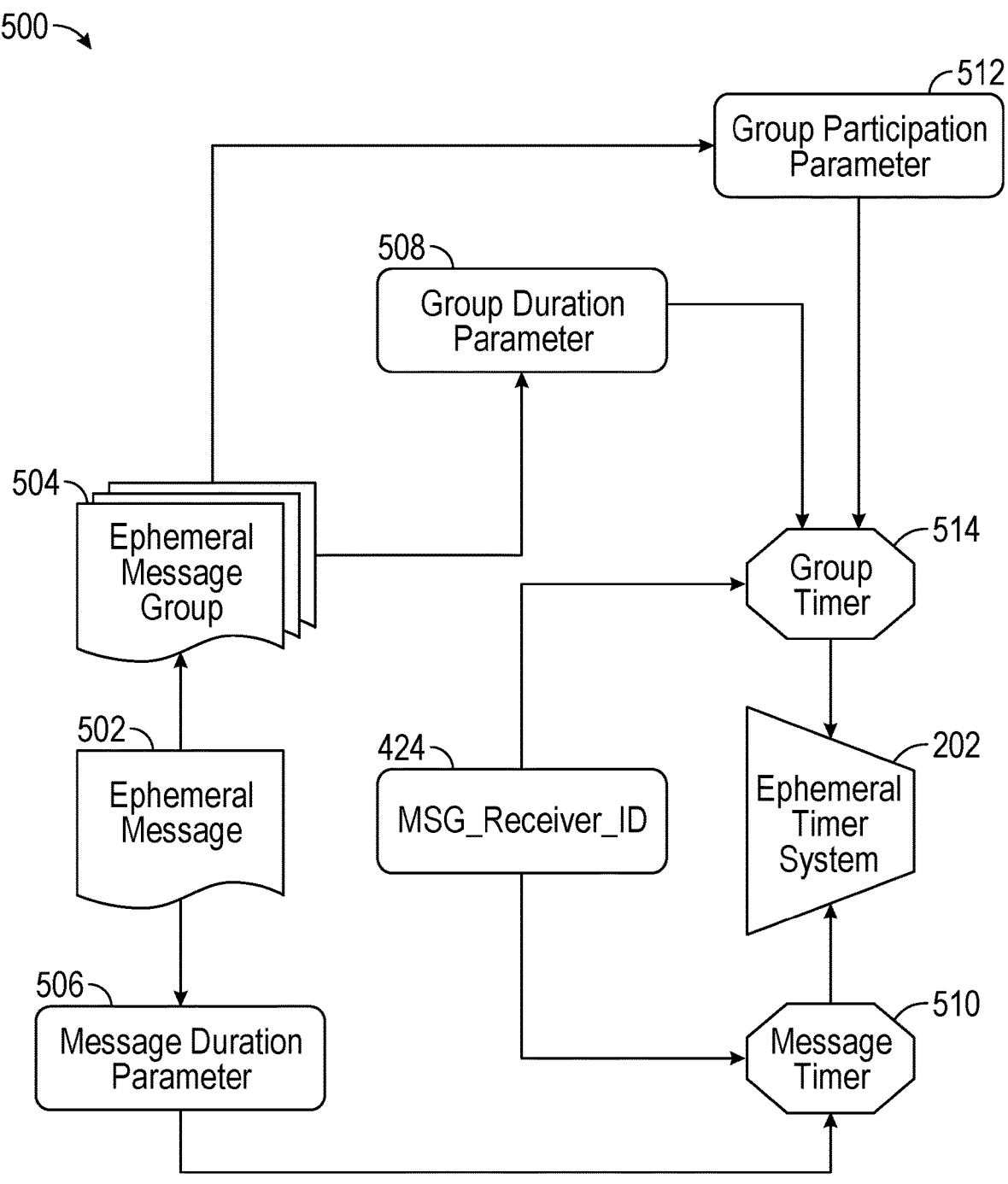
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Graphical Assistance with Tasks Using an AR Wearable Device

FIG. 6 illustrates a system 600 for graphical assistance with tasks using an AR wearable device, in accordance with some examples. The system 600 includes an AR wearable device 602 such as glasses 1200 of FIG. 12 and may include other devices such as a portion of the messaging server system 108 or the client device 102 that may perform one or more of the operations described herein.

The input/output (IO) devices 604 include devices that enable a user 644 to receive output or provide input to the system 600. The IO devices 604 include a microphone 606, a display 610, a speaker (not illustrated), an image capturing device 608, a button 612, a touchpad 613, a gyroscope (not illustrated), and so forth. The image capturing device 608 captures the image 616 of the real-world scene 670 which is a front facing view of the user view 672, which is what the user 644 sees through the AR wearable device 602, in accordance with some embodiments. The location (loc) 673 is 3D coordinates within a 3D world coordinate system that indicates a location of the user view 672. The image capturing device 608 may be charged-coupled device (CCD) or another type of device to capture an image of the real-world scene 670. Button 1278 of FIG. 12 is an example of button 612. Touchpad 1276 is an example of the touchpad 613. The button 612 and touchpad 613 enable the user 644 to provide haptic 646 input. The microphone 606 enables the user 644 to provide voice 650 input. The image capturing device 608 enables the user 644 to provide gesture 648 input via the UI module 634, which processes or analyzes the images 616 to determine the user intent 636 based on the gesture 648.

Some devices such as a gyroscope can be both a sensor 614 and an IO device 604. For example, the user 644 may move the AR wearable device 602, which changes the position 652 of the user 644 and communicates input to the AR wearable device 602. The position of the user 644 is assumed to be the same as the AR wearable device 602, in accordance with some embodiments. In accordance with some embodiments, the AR wearable device 602 detects the change in position 652 using a sensor 614 such as gyroscope or another inertia sensor to detect the change of position 652 of the user 644. In some embodiments, the AR wearable device 602 detects the change in position 652 by analyzing images 616 which may be done in conjunction with a sensor 614 such as a gyroscope. For example, the Simultaneous Localization and Mapping (SLAM) system may be implemented by the AR wearable device 602 and/or the backend 618. In still other embodiments, the AR wearable device 602 detects motion by exchanging wireless communications with a wireless device via the wireless module 659. In some embodiments, a GPS system is used to detection motion of the AR wearable device 602. Additionally, a combination of two or more of these methods may be used. The movement of the user 644 may have a user intent 636 to communicate input to the AR wearable device 602. However, the user 644 may move with the AR wearable device 602 without a user intent 636 to communicate input to the AR wearable device 602.

The sensors 614 includes a gyroscope, light sensor, a positioning sensor, a clock, and so forth. The wireless module 659 communicates 654 between the backend 618 and the AR wearable device 602. The wireless module 659 is configured to perform wireless communication protocols with the backend 618 such as LE Bluetooth, Institute for Electrical and Electronic Engineers (IEEE) 802.11 communication protocols, proprietary communications protocols, 3GPP communication protocols, and so forth. The wireless module 659 sets up a wireless communication link between the AR wearable device 602 and the backend 618. For example, the wireless module 659 associates with a corresponding wireless module on the backend 618. The wireless module 659 may communicate with the backend 618 via another intermediate device such as a user device 102, which may also be the backend 618, an access point, or a node B. In some embodiments, the wireless module 659 can be used to determine a location and/or an orientation of the AR wearable device 602 with the assistance of other wireless devices.

The assistance state 664 is stored in a memory of the AR wearable device 602 and indicates a state of the AR wearable device 602 for processing images 616 to assist with tasks 623. The assistance state 664 is changed based on user 644 input. For example, the user 644 may use the button 612, touchpad 613, voice 650 input, or gesture 648 input to turn the assistance state 664 to "on" or "off".

If the assistance state 664 is in an "on" state, then the image display module 624 causes an image 616 to be captured by the image capturing device 608 that the image display module 624 uses as the image 616 to process to identify surfaces 632 within the image 616. In some embodiments, an existing image 616 may be used by the image display module 624. The image display module 624 may continuously capture images 616 and process the images 616 to identify surfaces 632. In some embodiments, there are multiple image-capturing devices 608 and the image display module 624 selects one or more image capturing devices 608 that are front looking or that cover the real-world scene 670 as seen by the user 644 through, for example, glasses 1200.

The image display module 624 is configured to cause the image 616 to be sent to the backend 618 for processing by the machine learning (ML) module 620. The backend 618 may be the messaging service system 108 or the user device 102. In some embodiments, the ML module 620 resides within the AR wearable device 602. The functions of the ML module 620 may be divided between the backend 618 and the AR wearable device 602. For example, the ML module 620 on the backend 618 may identify all the surfaces 632 and an ML module on the AR wearable device 602 may identify objects within the image 616.

The ML module 620 processes the image 616 to generate data 662. The data 662 includes surfaces 632 along with other information for the surfaces 632. The other information includes a label 660 and a location 656. In some examples, the ML module 620 is a neural network trained to identify surfaces 632 and to label 660 the surfaces 632. In some embodiments, the ML module 620 is trained to identify a set of surfaces 632 that are likely to be of interest to the user 644 for performing a task 623.

The label 660 identifies the surface 632 with a label such as "wall", "paper", "floor", "ceiling", "painting", "person", "couch", "chair", and so forth. The surface 632 may be part of an object 661 such as "wall", "paper", "floor", "ceiling", "painting", "person", "couch", "chair", "room", and so forth. The label 660 may be different than the object 661. For example, a surface 632 may have a label 660 of "side wall" with the object 661 being "room". In another example, a surface 632 may have a label 660 of "front of chair" with the object 661 being "chair." The surfaces 632 that are recognized may be a finite number of surfaces 632 that the ML module 620 is trained to recognize where the surfaces 632 are selected based on surfaces 632 that a user 644 would likely want to identify for one of the tasks 623. The locations 656, 682, 688 are locations within 3D world coordinates, in accordance with some embodiments. In some embodiments, one or more of the locations 656, 682, 688 may be expressed relative to another location 656, 682, 688 or the position 652 of the user 644 or AR wearable device 602.

The user graphics 680 are graphics that are added by the user 644 in using the system 600. For example, the user 644 may add a user graphics 680 having a label 684 of "holes" which have a location 682 on a surface 632. In one example, the "holes" are place keepers for where the user 644 will hammer in nails for a painting.

The term AR graphics includes anything displayed by the AR wearable device 602 on the display 610 for the user 644 to view in conjunction with viewing the real world through lenses. Alternatively, the user 644 may view the real world by the AR wearable device 602 capturing images 616 and displaying the images 616 and the AR graphics on an opaque display 610.

For example, the AR graphics 686 are graphics that are generated by the image display module 624. In one example, an AR graphics 686 is a line between two user graphics 680 with labels 684 of "holes" where a label 690 of line indicates the distance between the two "holes." In another example, the AR graphics 686 includes information regarding the image 616 such as that it is likely an indoor image, which may be inferred by the image display module 624 or determined by the ML module 620 and included in the data 662. The AR graphics 686 includes indications of the surfaces 632, which may be labels or overlays. An overlay is an indication of the surface 632 by, for example, coloring the surface or creating another mirroring surface that appears in front of the surface 632.

The tasks 623 are tasks that the user 644 would like to complete. For example, the tasks 623 may include "hanging a painting", "measuring the distance between two points", "measuring the size of an object", "leveling an object", "determining wall height", "determining the size of paper", "determining the height of a human", and so forth. Each task 623 may include one or more steps 625. For example, the task 623 of "hanging a painting" includes "selecting positions for the nails", "nailing in the nails", and "hanging the painting" may each include one or more steps 625 for performing the task. The measurement unit 627 is a state that indicates a current unit of measurement to be used such as inches, centimeters, feet, meters, and so forth.

The image display module 624 processes the surfaces 632, user graphics 680, and AR graphics 686 and displays them on the display 610 for the user 644 to view in conjunction with viewing the user view 672 of the real-world scene 670. The image display module 624 uses the surfaces 632 to display AR graphics 686 which are labels 660 or overlays on the surfaces 632 to more clearly identify the surfaces 632 for the user 644, in accordance with some embodiments. The adjustment module 626 projects or adjusts the user graphics 680 and AR graphics 686 to be in a proper perspective for the location 673 of the user view 672. For example, the size and angle of a line is adjusted to fit on a surface 632 in accordance with the location 656 of the surface within the user view 672 of the real-world scene 670.

In some embodiments, motion sensors 614 are used to determine a movement 666 of the AR wearable device 602. A change of location 673 is then determined based on the movement 666. The user graphics 680 and AR graphics 686 can be moved a number of pixels based on the movement 666 of the AR wearable device 602, in accordance with some embodiments. The image display module 624 can display the surfaces 632, user graphics 680, and AR graphics 686 based on the locations 656, 682, and 688, and the location 673 of the user view 672 because the locations 656, 682, 688 and location 673 are 3D coordinates within a 3D world coordinate system. The new surfaces module 667 determines whether the image 616 needs to be analyzed for new surfaces 632 based on the previous user views 672 and locations 673 compared with a current user view 672 and location 673. In some embodiments, new surfaces module 667 uses a threshold to determine whether to process an image 616 to determine new data 662 or not. For example, if a new location 673 indicates that less than 5 percent of the user view 672 has changed since an old location 673, then the new surfaces module 667 determines not to process the image 616 for new data 662. Not processing an image 616 may have little to no effect on the experience of the user 644 but may prevent latency and save energy, in accordance with some embodiments. In some embodiments, the UI module 634 presents a user interface item that provides the user 644 with the option of processing an image 616 to acquire new data 662.

The UI module 634 processes input from the IO devices 604 to determine a user intent 636 from the user 644. The UI module 634 determines whether it was the user intent 636 to turn the assistance state 664 "on" or "off." The UI module 634 offers or displays user interface items such as menus of options for the selection of a task 623. The UI module 634 enables a user 644 to add user graphics 680 such as the "holes". The user 644 may select an area of the image 616 to add user graphics 680 using a gesture 648 such as a movement of their finger. The UI module 634 analyzes the movement of the finger by analyzing images 616 captured over time. The UI module 634 may determine or estimate a gaze location of the user 644. The user intent 636 may be determined based on input from the user 644 as well as a current task 623 and step 625.

In some embodiments, the image display module 624 maintains a data structure for storing surfaces 632 with their locations 656 so that if a user 644 moves and then returns the surfaces 632 and locations 656 are still accessible to the AR wearable device 602. For example, a user 644 may walk out of a room and then back into the room. The AR wearable device 602 keeps track of its position 652 using 3D coordinates within a 3D world coordinate system and determines the user view 672 based on the position 652, in accordance with some embodiments. In some embodiments, the new surfaces module 667 determines not to process new images 616 since the user 644 is in the middle of a task 623 such as "hanging a painting." For example, the user 644 may set the "holes" to hang the painting, which may be a picture, and then walk into another room. The new surfaces module 667 determines the user 644 is no longer in the location of the task 623 so it stops to process new images 616 for the data 662. The user 644 may cause the AR wearable device 602 to begin to process new images 616 for the data 662 by ending the task 623, resetting the tasks 623, or starting a new task 623.

The user 638 is data that is related to the user 644. The information (info) 642 includes input data from the user 644 and may include additional information about the user 638 such as a social media account to log onto the messaging server system 108, a user name, and so forth.

Figure 7:
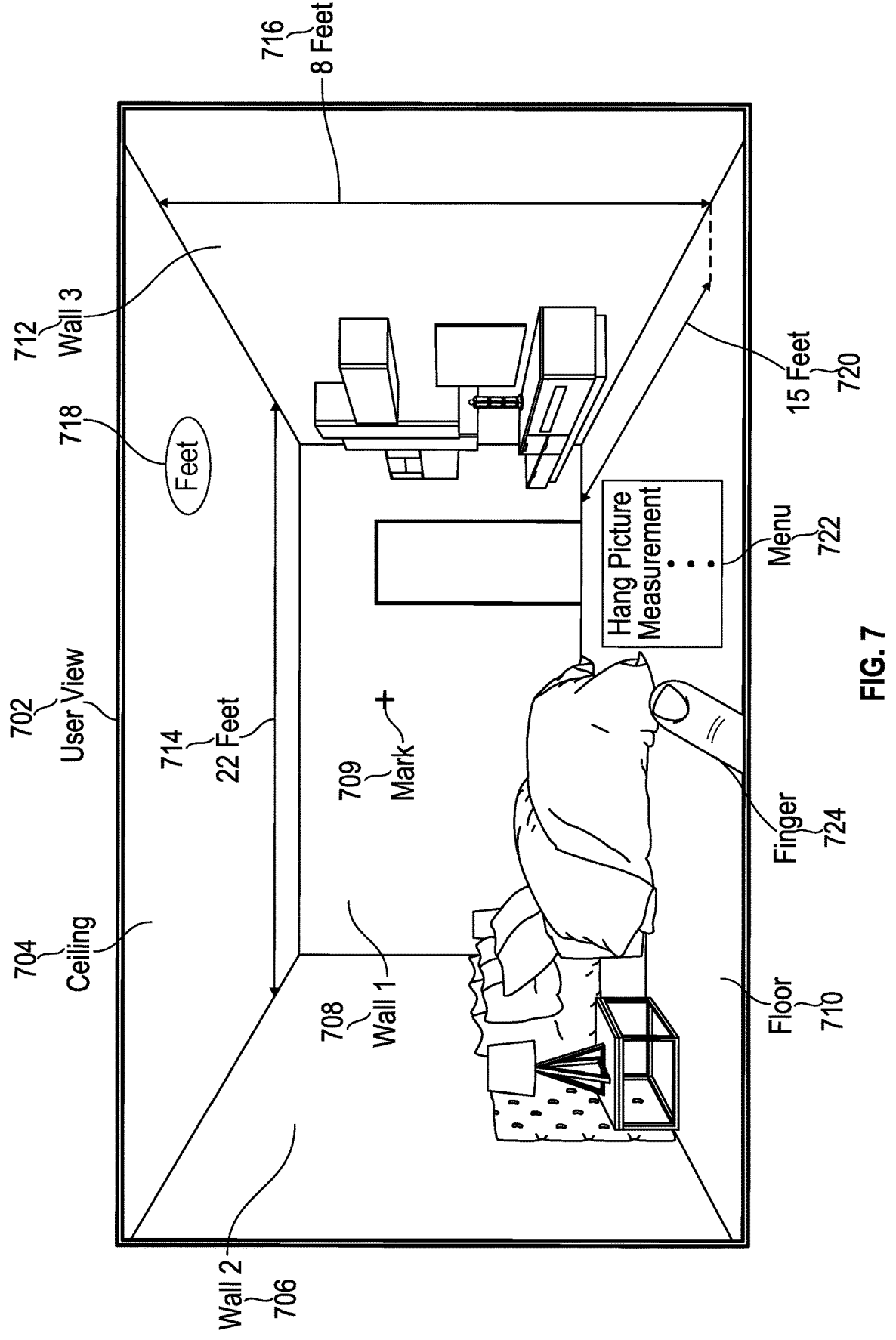
FIG. 7 illustrates the operation of a system for graphical assistance with tasks, in accordance with some embodiments.

FIG. 7 illustrates the operation of a system for graphical assistance with tasks, in accordance with some embodiments. The user view 672 is what the user 644 sees while wearing the AR wearable device 602. The assistance state 664 is "on". The image display module 624 processes the images 616 and may set the image capturing device 608 to regularly capture images 616 in order for the user 644 to perceive the user graphics 680 and AR graphics 686 in a proper place within the user view 672 and without the user graphics 680 and AR graphics 686 appearing to jump or be distorted. For example, the image display module 624 may capture 30 images 616 per second, or another suitable number. In some embodiments, the image display module 624 adjusts the user graphics 680 and AR graphics 686 based on the location 63 of the user view 672 changing.

The image display module 624 either sends the image 616 to the backend 618 or processes it on the AR wearable device 602. The data 662 is created for the image 616, which includes the surfaces 632.

The image display module 624 displays on the display 610 the labels 660 of surfaces 632, which include "Wall 1" 708, "Wall 2" 706, "Ceiling" 704, "Wall 3" 712, and "Floor" 710. In some embodiments, the surfaces 632 are displayed with an overlay such as a thin cuboid that is projected onto the surface and may have a different color. The image display module 624 displays a UI item "Feet" 718, which indicates that "Feet" are the current measurement unit 627. The user 644 may select the UI item "Feet" 718 to change the measurement unit 627. The image display module 624 determined some AR graphics 868 by determining some distances and heights based on the surfaces 632 and locations 656, in accordance with some embodiments. The AR graphics 868 include "22 Feet" 714, "15 Feet" 720, and "8 Feet" 716.

The image display module 624 displays menu 722 on the display 610. The menu 722 indicates tasks 623 from which the user 644 may select. For example, the user 644 may indicate a selection of "Hang Painting" by performing a gesture 648 to select "Hang Painting" with the finger 724 of the user 644. The UI module 634 determines the user intent 636 is to select "Hang Painting" based on identifying the gesture 648 and position of the finger 724 over "Hang Painting." In other examples, the user 644 may use the button 612, touchpad 613, or voice 650 input, to select a task 623 from the menu 722.

The "+" is a mark 709, which is an indication of where the UI module 634 has determined is the center of focus of the user 644. The user 644 may select locations 682 of user graphics 680 or select UI items based on the position of the mark 709. For example, the user 644 may move the mark 709 to the task 623 "Hang Painting" and then perform a selection to select the task 623 "Hang Painting". The selection may be haptic 646, a gesture 648, a voice 650 command, or another input. In some embodiments, the UI module 634 determines where the focus of the eyes of the user 644 are to determine the position of the mark 709. In some embodiments, the position of the mark 709 is determined by centering the mark within the user view 672. In some embodiments, the menu 722 is given a fixed location within a user view 672, which enables the user 644 to move, for example, their head to position the mark 709 over a UI item. In some embodiments, the finger 724 of the user 644 is used to move the location 682 of the mark 709.

Figure 8:
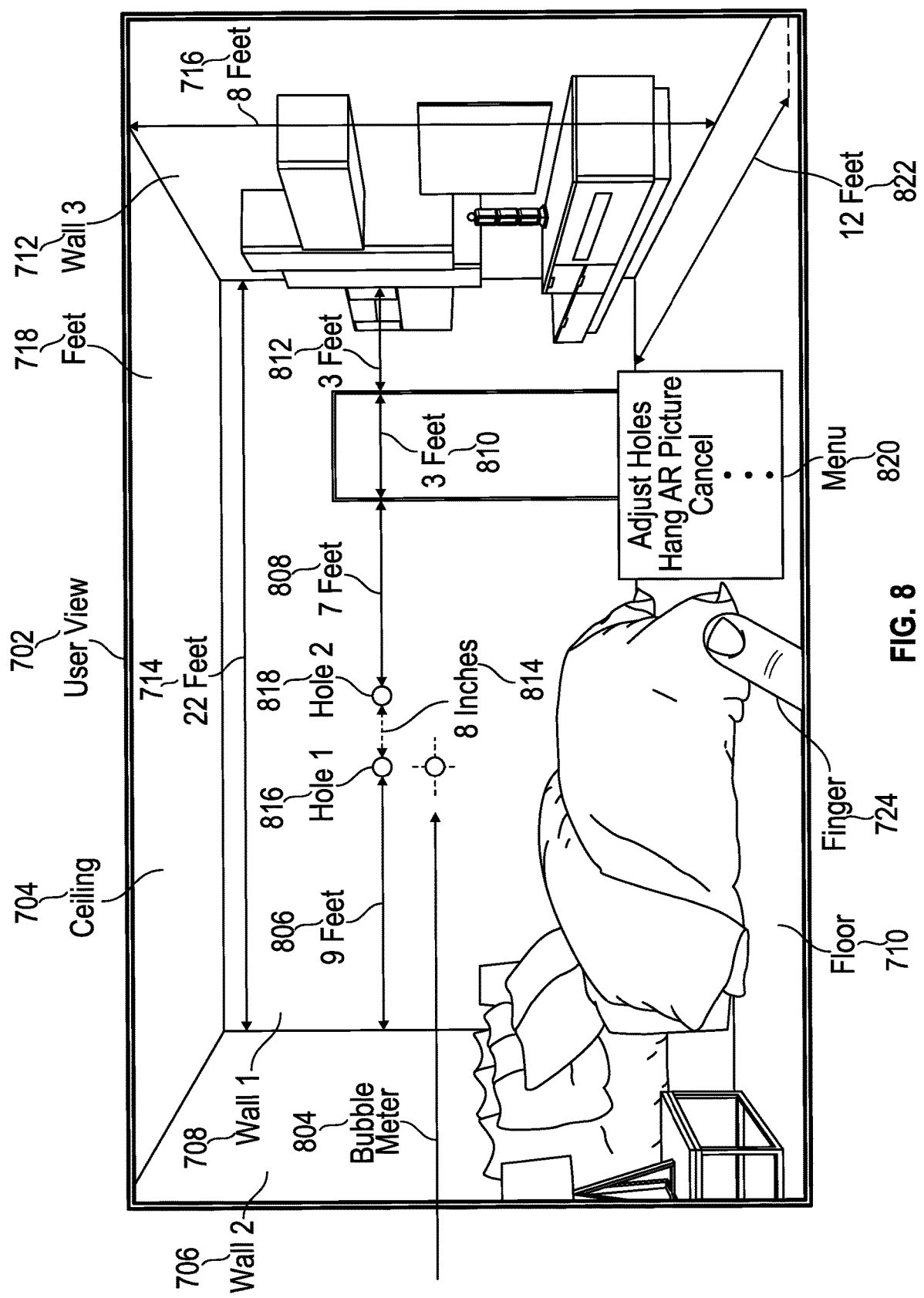
FIG. 8 illustrates the operation of a system for graphical assistance with tasks, in accordance with some embodiments.

FIG. 8 illustrates the operation of a system for graphical assistance with tasks, in accordance with some embodiments. FIG. 8 illustrates the situation where a user 644 has selected the task 623 "Hang Painting" from the menu 722. The user 644 selected "Hole 1" 816 and "Hole 2" 818 where they intend on placing nails to perform the task 623 of "Hang Painting." The holes may be placed by the user 644 by selecting a location 682 for the user graphics 680 of a hole. "Hole 1" is a label 684. The user 644 selects the location 682 of a hole by placing the mark 709 of FIG. 7 over the location 682 and then selecting the location 682.

Alternatively, the user 644 uses their finger 724 to select the location 682 of the hole. The task 623 of "Hang Painting" has steps 625 including one or more of the following: capture image of front of real painting, capture image of back of real painting, determine location of "Hole 1" 816, determine location of "Hole 2", "Adjust holes", "Hang AR Painting", "Cancel", and so forth. In some embodiments, the image display module 624 prompts the user 644 to perform one or more of the steps 625 such as to capture an image of the front and back of the real painting. In some embodiments, during a step 625 such as capture an image of the real painting, the image display module 624 will suspend processing of images 616 for surfaces 632 to save on battery life. For example, a user 644 may be performing the step 625 of taking an image 616 of the real painting by walking into another room, so the image display module 624 suspends processing the images 616 for surfaces 632 while the user 644 goes to take an image 616 of the real painting until the user 644 returns back to the original room. The menu 820 has changed from FIG. 7 where the UI items that are displayed are now options within the task 623 of "Hang Painting" and include "Adjust Holes", "Hang AR Painting", and "Cancel". A bubble meter 804 is displayed that indicates whether an imaginary line between "Hole 1" 816 and "Hole 2" 818 is level or plumb. Additionally, the image display module 624 has added additional AR graphics 686 to indicate the relative location of the holes. For example, the new AR graphics 686 are "9 Feet" 806, "8 Inches" 814, "7 Feet" 808, "3 Feet" 810, and "3 Feet" 812. The user view 672 within the real-world scene 670 has changed where the user 644 has stepped closer to "Wall 1" 708. The image display module 624 displays "12 Feet" 822 instead of the "15 Feet" 720 because the user 644 has stepped within 15 feet of "Wall 1" 708. The image display module 624 adjusts the user graphics 680, surfaces 632, and AR graphics 686 based on the changed location 673 of the user 644 using the locations 682, 656, and 688, respectively, within a 3D world coordinate system.

Figure 9:
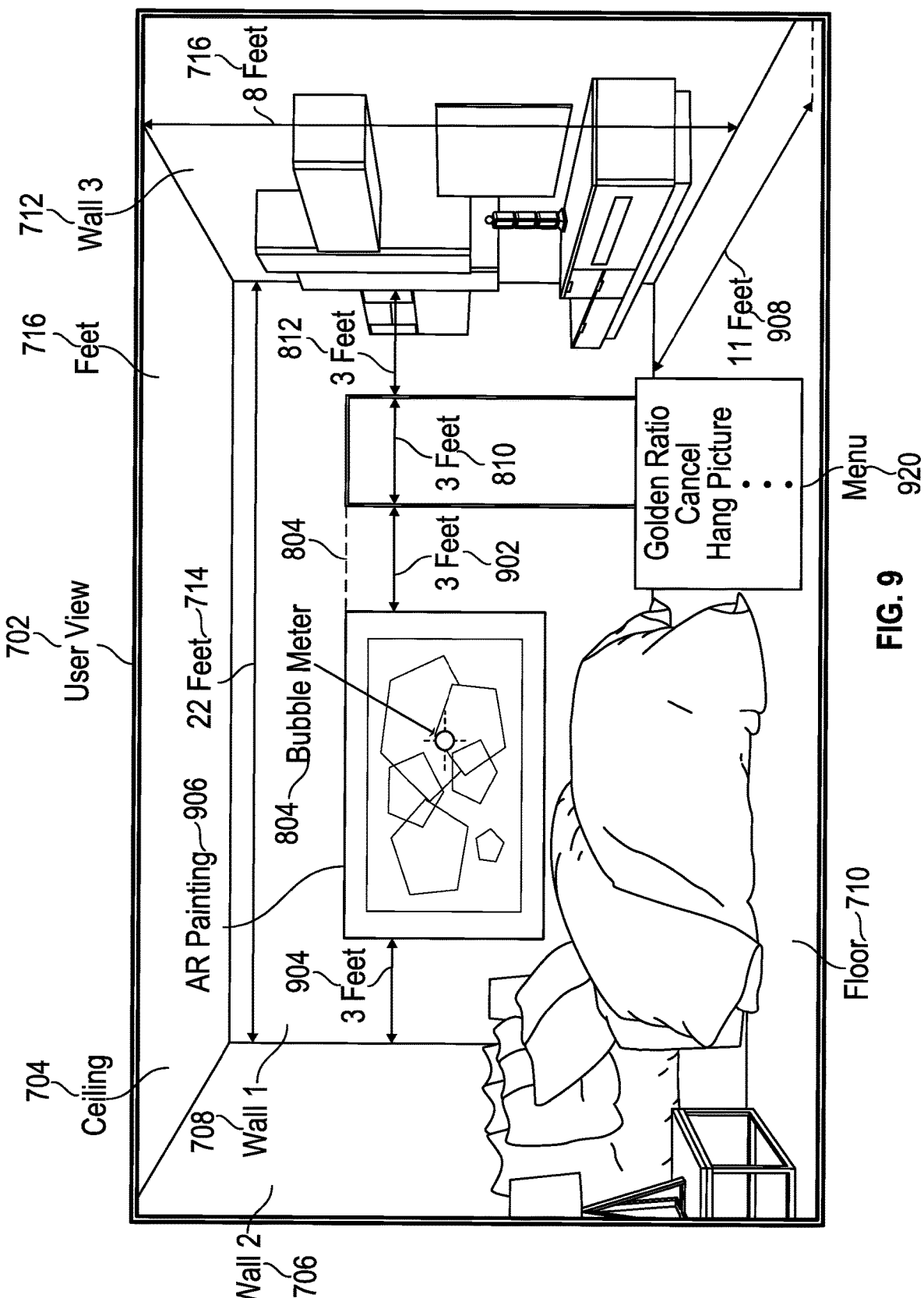
FIG. 9 illustrates the operation of a system for graphical assistance with tasks, in accordance with some embodiments.

FIG. 9 illustrates the operation of a system for graphical assistance with tasks, in accordance with some embodiments. FIG. 9 illustrates FIG. 8 after the selection of "Hang AR Painting" UI item of menu 820. The image display module 624 displays an AR painting 906. The image display module 624 resizes the AR painting 906 in accordance with the location 673 of the user view 672 relative to the place on "Wall 1" 708 where the "AR Painting" 906 is displayed. The size of the AR painting 906 may be adjusted and the size of the AR painting 906 may be determined by capturing an image 616 of the real painting. The user view 672 within the real-world scene 670 has changed where the user 644 has stepped closer to "Wall 1" 708. The image display module 624 displays "11 Feet" 908 instead of the "12 Feet" 822 because the user 644 has stepped within 11 feet of "Wall 1" 708. The image display module 624 displays "3 Feet" 904, "3 Feet" 902, "3 Feet" 810, and "3 Feet" 812. The user 644 can adjust the "AR Painting" 906 by selecting the UI item "Golden Ratio" in menu 920. After the user 644 selects "Golden Ratio" from the menu 920, the image display module 624 adjusts the location 688 of the "AR Painting" so that the height above the floor to the "AR painting" divided by the distance from the top of the "AR painting" to the "Ceiling" 704 is the "Golden Ratio". The image display module 624 may perform other adjustments of the location 688 of the "AR Painting" 906 such as from left to right in accordance with the "Golden Ratio." The position of the AR painting 906 may further be determined based on a position of a hanger on the back of the actually painting.

If the user 644 selects the user interface item "Hang Painting" from the menu 920, then the AR painting 906 will be removed and "Hole 1" 816 and "Hole 2" 818 will be visible. "Hole 1" 816 and "Hole 2" 818 may have been adjusted or leveled in accordance with a selection of the bubble meter 804, an initial option that places holes in a straight horizontal line, a selection of the "Golden Ratio", the user 644 moving the AR painting 906, or another reason. The user 644 then places the nails in "Hole 1" 816 and "Hole 2" 818 and hangs the real painting, which should look the same as or similar to the AR painting 906.

Figure 10:
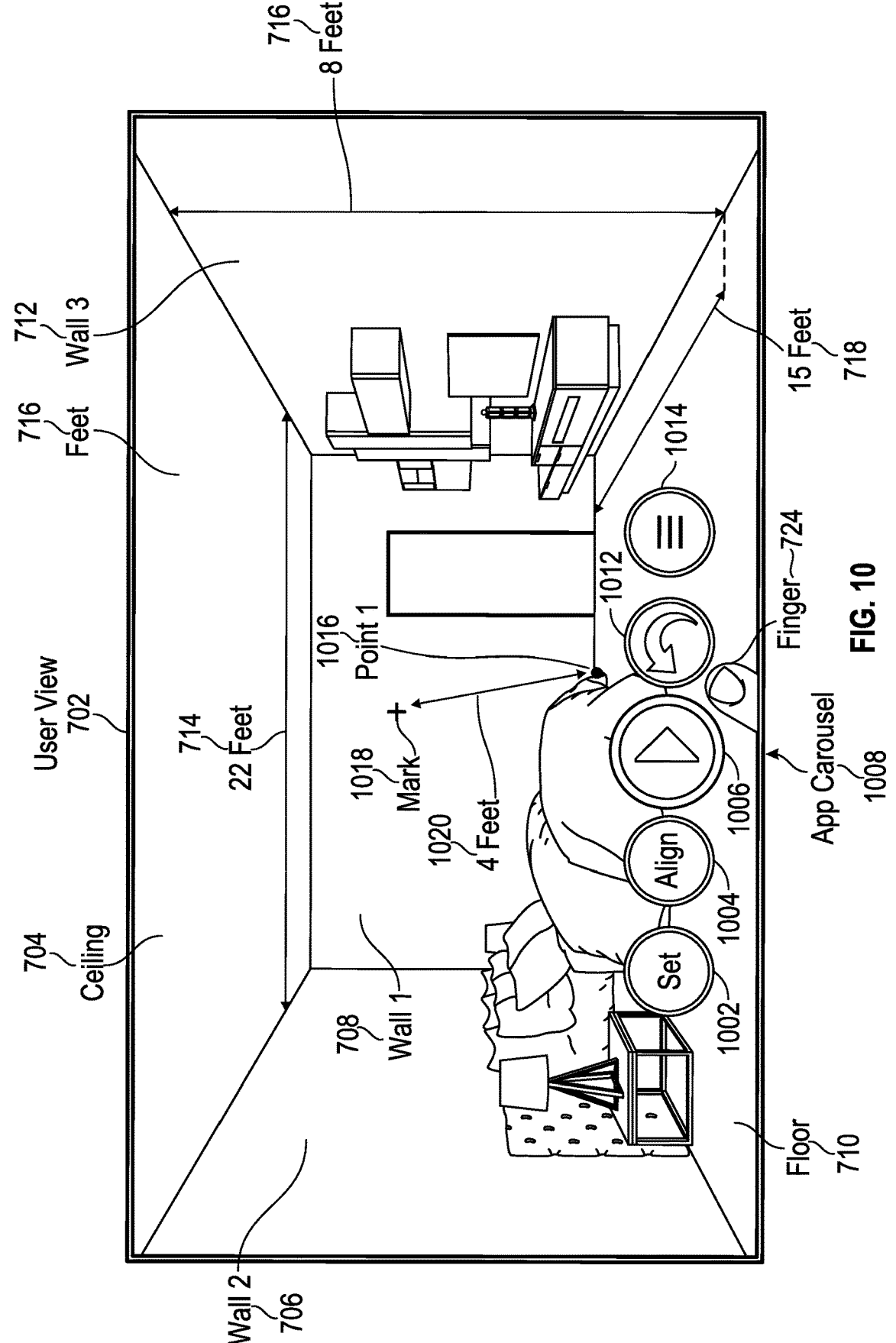
FIG. 10 illustrates the operation of a system for graphical assistance with tasks, in accordance with some embodiments.

FIG. 10 illustrates the operation of a system for graphical assistance with tasks, in accordance with some embodiments. In FIG. 10, the user 644 is in the middle of the task 623 of determining a distance between two points. The user 644 has selected "Point 1" 904 and the second point is currently the "Mark" 1018. The distance between "Point 1" 904 and "Mark" 1018 is "4 Feet" 1020. The user 644 may continue to move the "Mark" 1018 around the room. An app carousel 1008 is displayed with options for the user 644 to select from. The options include "Set" 1002, which would set the "Mark" 1018 at its current location, "Align" 1004, which would move the "Mark" 1018 to align it in accordance with some symmetry with "Point 1" 1016, go 1006, which will toggle through the steps 625 of the current task 623, cancel 1012, which cancels the current task 623, and menu 1014, which displays a menu similar to menu 920.

Figure 11:
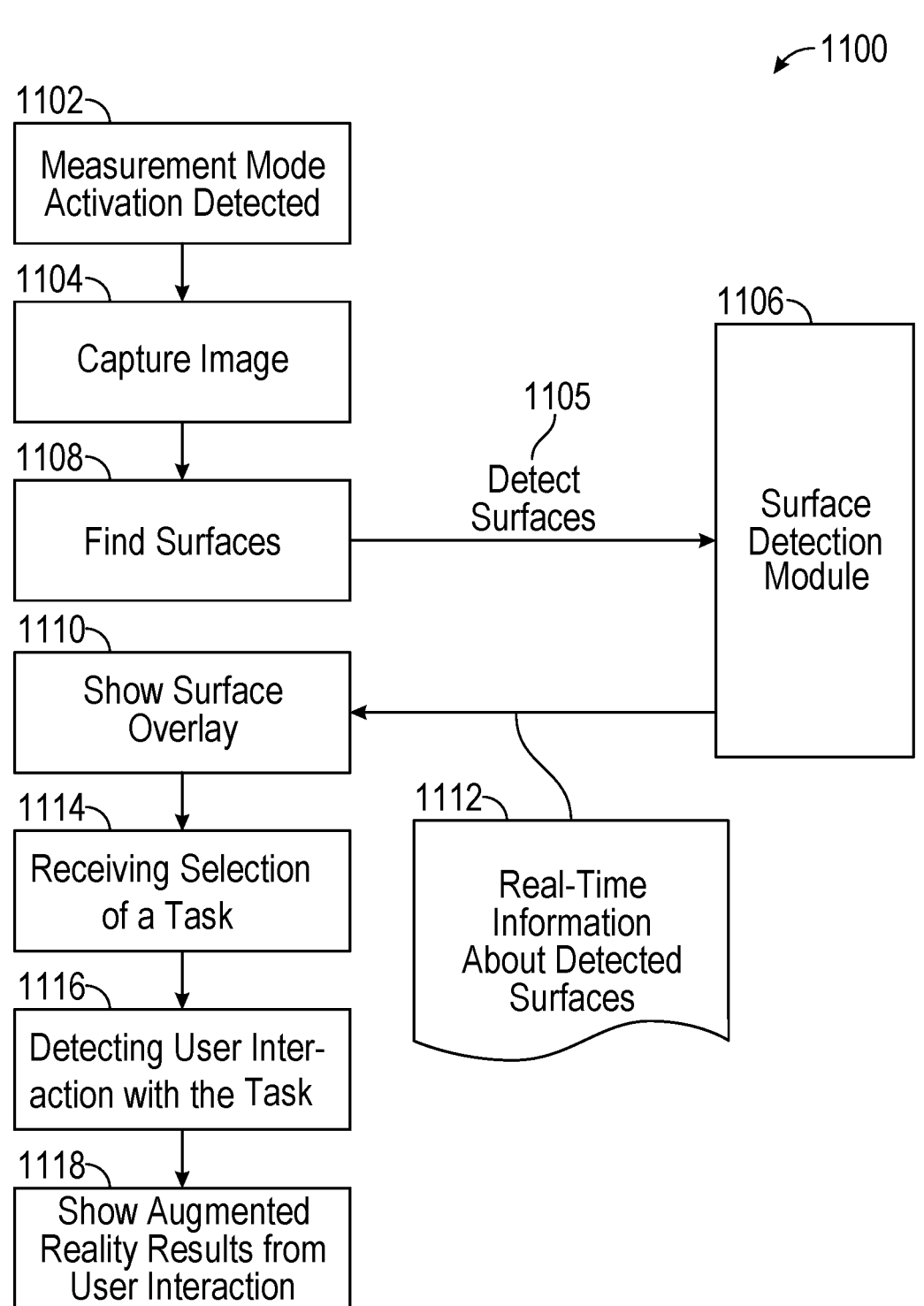
FIG. 11 illustrates a method for graphical assistance with tasks using an AR wearable device, in accordance with some examples.

FIG. 11 illustrates a method 1100 for graphical assistance with tasks using an AR wearable device, in accordance with some examples. The method 1100 may be performed by an AR wearable device 602 such as glasses 1200 of FIG. 12. One or more of the operations may be performed wholly or in part by other devices such as a portion of the messaging server system 108 or the client device 102.

The method 1100 begins at operation 1102 with detecting a measurement mode activation. For example, the user 644 selects a button 612 of the AR wearable device 602, uses a gesture 648, or a voice 650 command to set assistance state 664 to "on".

The method 1100 continues at operation 1104 with capturing an image. For example, the image display module 624 causes the image capturing device 608 to capture an image 616.

The method 1100 continues at operation 1108 with finding surfaces, which includes sending an image with an instruction to detect surfaces 1105 to a surface detection module 1106, which returns real-time information about detected surfaces 1112, which is an example of data 662. For example, the image display module 624 sends the image 616 with an instruction to find the surfaces 632 to a backend 618 where an ML module 620 finds the surfaces 632 and sends back data 662 with indications of the surfaces 632. In some embodiments, the AR wearable device 602 may find the surfaces 632 using an ML module 620 that resides on the AR wearable device 602.

The method 1100 continues at operation 1110 with showing the surface overlays. For example, the image display module 624 displays the surfaces 632, user graphics 680, and AR graphics 686 as discussed herein. Additionally, the AR wearable device 602 may after initially finding the surfaces 632 for one or more images 616 determine to not process additional images 616 until the location 673 of the user view 672 changes greater than or transgresses a threshold or less than or does not transgress a threshold. For example, the threshold can be based on a change in location 673 of the user view 672 such as a threshold of 5 degrees of a rotation of the AR wearable device 602 where the 5 degrees is determined based on a change in the location 673 of the user view 672. The user view 672 changes as the user 644 changes location 673. The user views 672 may be termed a first user view 672, a second user view 672, a third user view 672, and so forth to indicate the change in location 673 as the user 644 moves.

The method 1100 continues at operation 1114 with receiving a selection of a task. For example, the AR wearable device 602? detects a user 644 selection of a task 623 such as "Hang Painting" from menu 722 of FIG. 7. The method 1100 continues at operation 1116 with detecting user interaction with the task. For example, FIGS. 7-10 illustrate a user 644 interacting with the system 600 to perform a task 623. Specifically, in FIGS. 7-9 the AR wearable device 602? detects the user interaction selecting the task "Hanging a Painting", and in FIG. 10 the AR wearable device 602? detects the user 644 interaction selecting the task of determining the "distance between two points".

The method 1100 continues at operation 1118 with showing AR results from the detected user interaction. For example, in FIG. 8, "Hole 1" 816 and "Hole 2" 818 are displayed on the display 610 of the AR wearable device 602 and remain displayed while the user 644 nails a nail into locations where "Hole 1" 816 and "Hole 2" 818 are.

The method 1100 may include one or more additional operations. Operations of method 1100 may be performed in a different order. One or more of the operations of method 1100 may be optional. The method 1100 may be performed by the client device 102, system 600, glasses 1200, or another electronic device. Portions of the functionality may be performed on a server computer or host computer. For example, glasses 1200 may be coupled to a host client device 102 or application server 114 where one or more of the operations are performed.

FIG. 12 is a perspective view of a wearable electronic device in the form of glasses 1200, in accordance with some examples. The glasses 1200 are an article of eyewear including electronics, which operate within a network system for communicating image and video content. In some examples, the wearable electronic device is termed AR glasses. The glasses 1200 can include a frame 1232 made from any suitable material such as plastic or metal, including any suitable shape memory alloy. The frame 1232 can have a front piece 1233 that can include a first or left lens, display, or optical element holder 1236 and a second or right lens, display, or optical element holder 1237 connected by a bridge 1238. The front piece 1233 additionally includes a left end portion 1241 and a right end portion 1242. A first or left optical element 1244 and a second or right optical element 1243 can be provided within respective left and right optical element holders 1236, 1237. Each of the optical elements 1243, 1244 can be a lens, a display, a display assembly, or a combination of the foregoing. In some examples, for example, the glasses 1200 are provided with an integrated near-eye display mechanism that enables, for example, display to the user of preview images for visual media captured by cameras 1269 of the glasses 1200.

The frame 1232 additionally includes a left arm or temple piece 1246 and a right arm or temple piece 1247 coupled to the respective left and right end portions 1241, 1242 of the front piece 1233 by any suitable means such as a hinge (not shown), so as to be coupled to the front piece 1233, or rigidly or fixedly secured to the front piece 1233 so as to be integral with the front piece 1233. Each of the temple pieces 1246 and 1247 can include a first portion 1251 that is coupled to the respective end portion 1241 or 1242 of the front piece 1233 and any suitable second portion 1252, such as a curved or arcuate piece, for coupling to the ear of the user. In one example, the front piece 1233 can be formed from a single piece of material, so as to have a unitary or integral construction. In one example, the entire frame 1232 can be formed from a single piece of material so as to have a unitary or integral construction.

The glasses 1200 include a computing device, such as a computer 1261, which can be of any suitable type so as to be carried by the frame 1232 and, in one example, of a suitable size and shape, so as to be at least partially disposed in one or more of the temple pieces 1246 and 1247. In one example, the computer 1261 has a size and shape similar to the size and shape of one of the temple pieces 1246, 1247 and is thus disposed almost entirely if not entirely within the structure and confines of such temple pieces 1246 and 1247.

In one example, the computer 1261 can be disposed in both of the temple pieces 1246, 1247. The computer 1261 can include one or more processors with memory, wireless communication circuitry, and a power source. The computer 1261 comprises low-power circuitry, high-speed circuitry, location circuitry, and a display processor. Various other examples may include these elements in different configurations or integrated together in different ways. Additional details of aspects of the computer 1261 may be implemented as described with reference to the description that follows.

The computer 1261 additionally includes a battery 1262 or other suitable portable power supply. In one example, the battery 1262 is disposed in one of the temple pieces 1246 or 1247. In the glasses 1200 shown in FIG. 12, the battery 1262 is shown as being disposed in the left temple piece 1246 and electrically coupled using a connection 1274 to the remainder of the computer 1261 disposed in the right temple piece 1247. One or more input and output devices can include a connector or port (not shown) suitable for charging a battery 1262 accessible from the outside of the frame 1232, a wireless receiver, transmitter, or transceiver (not shown), or a combination of such devices.

The glasses 1200 include digital cameras 1269. Although two cameras 1269 are depicted, other examples contemplate the use of a single or additional (i.e., more than two) cameras 1269. For ease of description, various features relating to the cameras 1269 will be described further with reference to only a single camera 1269, but it will be appreciated that these features can apply, in suitable examples, to both cameras 1269.

In various examples, the glasses 1200 may include any number of input sensors or peripheral devices in addition to the cameras 1269. The front piece 1233 is provided with an outward-facing, forward-facing, front, or outer surface 1266 that faces forward or away from the user when the glasses 1200 are mounted on the face of the user, and an opposite inward-facing, rearward-facing, rear, or inner surface 1267 that faces the face of the user when the glasses 1200 are mounted on the face of the user. Such sensors can include inward-facing video sensors or digital imaging modules such as cameras 1269 that can be mounted on or provided within the inner surface 1267 of the front piece 1233 or elsewhere on the frame 1232 so as to be facing the user, and outward-facing video sensors or digital imaging modules such as the cameras 1269 that can be mounted on or provided with the outer surface 1266 of the front piece 1233 or elsewhere on the frame 1232 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1243, 1244 (or lenses) to provide a mixed reality or augmented reality experience for the user of the glasses 1200.

The glasses 1200 further include an example of a camera control mechanism or user input mechanism comprising a camera control button mounted on the frame 1232 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1232 adjacent to its surface for detecting the presence of a user's finger, to dispose the touch-sensitive button to the engaged condition when the user touches a finger to the corresponding spot on the outer surface 1266 of the frame 1232. It will be appreciated that the above-described camera control button and capacitive touch button are but two examples of a haptic input mechanism for single-action control of the camera 1269, and that other examples may employ different single-action haptic control arrangements.

The computer 1261 is configured to perform the methods described herein. In some examples, the computer 1261 is coupled to one or more antennas for reception of signals from a GNSS and circuitry for processing the signals where the antennas and circuitry are housed in the glasses 1200. In some examples, the computer 1261 is coupled to one or more wireless antennas and circuitry for transmitting and receiving wireless signals where the antennas and circuitry are housed in the glasses 1200. In some examples, there are multiple sets of antennas and circuitry housed in the glasses 1200. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors housed in glasses 1200 and coupled to the computer 1261. In some examples, the glasses 1200 are VR headsets where optical elements 1243, 1244 are opaque screens for displaying images to a user of the VR headset. In some examples, the computer 1261 is coupled to user interface elements such as slide or touchpad 1276 and button 1278. A long press of button 1278 resets the glasses 1200. The slide or touchpad 1276 and button 1278 are used for a user to provide input to the computer 1261 and/or other electronic components of the glasses 1200. The glasses 1200 include one or more microphones 1282 that are coupled to the computer 1261. The glasses 1200 include one or more gyroscopes 1280.

FIG. 13 illustrates a method 1300 for graphical assistance with tasks using an AR wearable device, in accordance with some examples. The method 1100 may be performed by an AR wearable device 602 such as glasses 1200 of FIG. 12. One or more of the operations may be performed wholly or in part by other devices such as a portion of the messaging server system 108 or the client device 102.

The method 1300 begins at operation 1302 with capturing, by an image capturing device of the AR wearable device, an image corresponding to a first user view of a real-world scene. For example, image display module 624 causes the image capturing device 608 to capture image 616.

The method 1300 continues at operation 1304 with accessing, in a memory of the AR wearable device, data indicating a plurality of surfaces within the image and a plurality of locations for the plurality of surfaces. For example, the image display module 624 accessing the data 662, which includes surfaces 632.

The method 1300 continues at operation 1306 with displaying, on a display of the AR wearable device, indications of the plurality of surfaces, where positions of the indications of the plurality of surfaces on the display are based on the plurality of locations of the plurality of surfaces and a second user view of the real-world scene. For example, the image display module 624 displays indications of the surfaces 632 on the display 610 of the AR wearable device 602 where the positions of the indications are based on the locations 656 and a current location 673 of the user view 672, which may be different than the location 673 of the user view 672 when the image 616 was taken.

The method 1300 continues at operation 1308 with identifying a location of a point on a surface of the plurality of surfaces based on input from a user. For example, UI module 634 identified a location 682 of "Hole 1" 816 of FIG. 8, which is a user graphics 680, based on a focus area of the user 644 and input from the user 644 selecting the location 682.

The method 1300 continues at operation 1310 with displaying, on the display of the AR wearable device, an indication of the point on the surface, where a position of the point is based on the location of the point and a third user view of the real-world scene. For example, continuing with the example above, the image display module 624 displays "Hole 1" 816 of FIG. 8 at a position based on the location 656 of "Hole 1" 816 and a third location 673 of the user view 672.

The method 1300 may include one or more additional operations. Operations of method 1300 may be performed in a different order. One or more of the operations of method 1300 may be optional. The method 1300 may be performed by the client device 102, system 600, glasses 1200, or another electronic device. Portions of the functionality may be performed on a server computer or host computer. For example, glasses 1200 may be coupled to a host client device 102 or application server 114 where one or more of the operations are performed.

Machine Architecture

Figure 14:
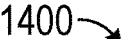
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
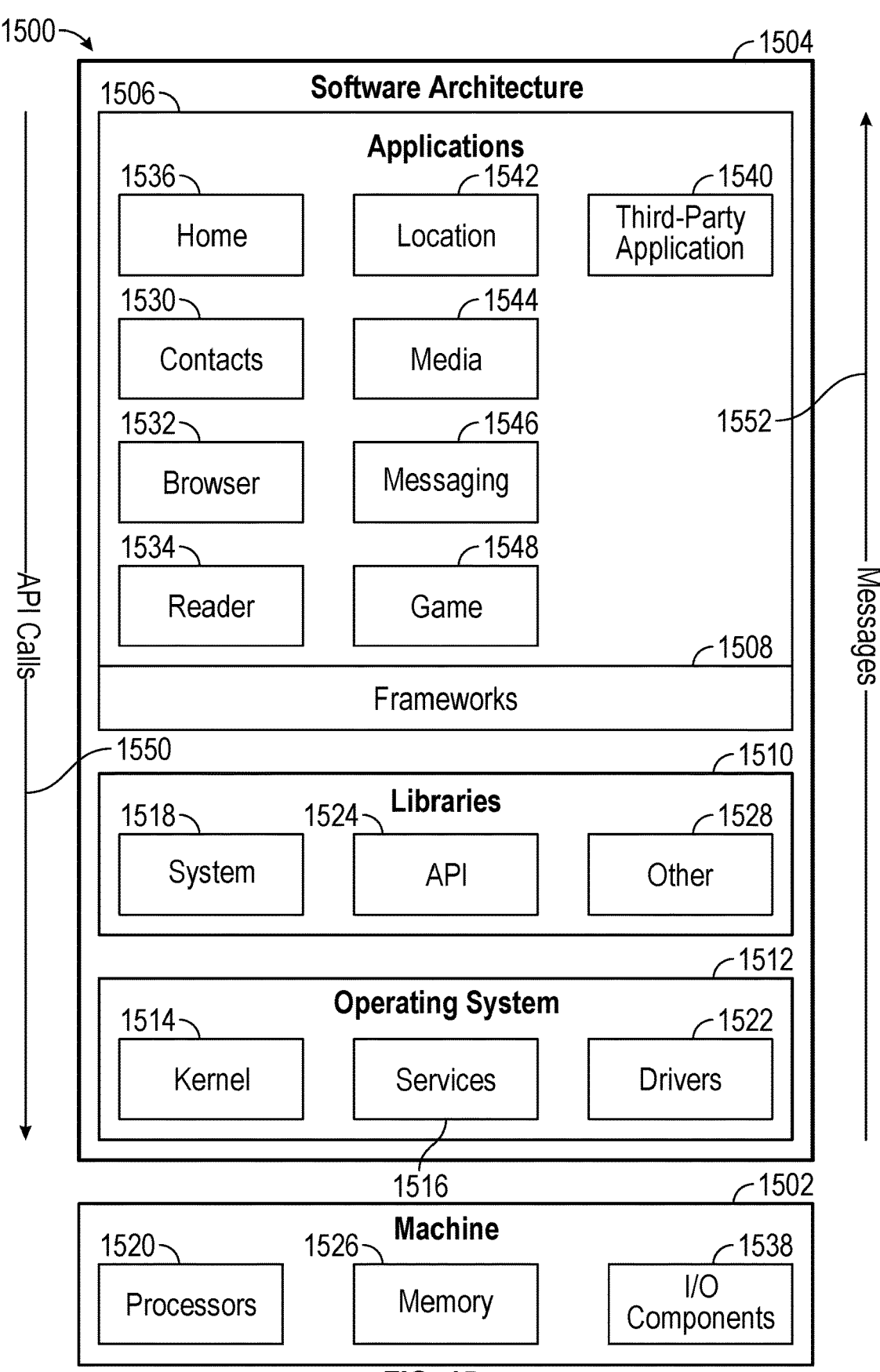
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
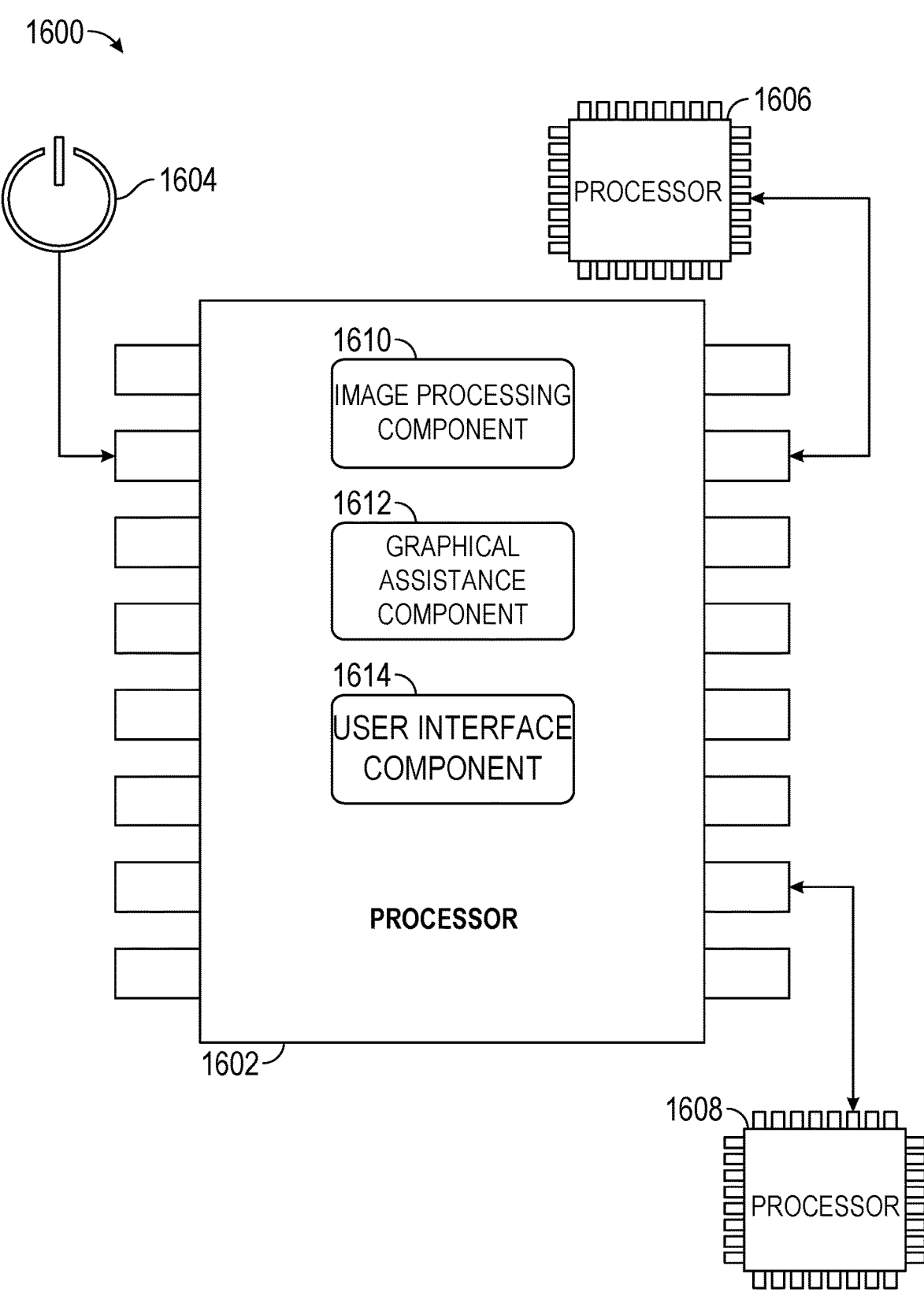
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely an image processing component 1610, a graphics assistance component 1612, and a user interface component 1614. The image processing component 1610 is invoked to process images 616 to determine surfaces 632 and other information regarding the surfaces 632. For example, the ML module 620 processes the images 616 to generate the data 662 including the surfaces 632 and accompanying information.

The graphical assistance component 1612 displays user graphics 680, AR graphics 686, and surfaces 632 on the display 610 of the AR wearable device 602. For example, the image display module 624 displays user graphics 680, AR graphics 686, and surfaces 632 on the display 610 to assist the user 644 in performing tasks 623.

The user interface component 1614 interacts with the user 644 to determine the user intent 636 of the user 644. For example, the UI module 634 processes the haptic 646, gesture 648, voice 650, and position 652 input of user 644 to determine the user intent 636. The UI module 634 presents, on the display 610, UI items such as app carousel 1008. As illustrated, the processor 1602 is communicatively coupled to both the processor 1606 and the processor 1608.

Glossary

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on an augmented reality (AR) wearable device, the method comprising:

capturing, by an image capturing device of the AR wearable device, an image corresponding to a first user view of a real-world scene;

accessing, in a memory of the AR wearable device, data indicating a plurality of surfaces within the image and a plurality of locations for the plurality of surfaces;

displaying, on a display of the AR wearable device, indications of the plurality of surfaces as overlays on the real-world scene, wherein the indications further comprise labels identifying surfaces of the plurality of surfaces and three-dimensional geometric representations including at least one cuboid overlaid on at least one surface of the plurality of surfaces, wherein positions of the indications of the plurality of surfaces on the display are based on the plurality of locations of the plurality of surfaces and a second user view of the real-world scene;

identifying a location of a point on a surface of the plurality of surfaces based on input from a user; and displaying, on the display of the AR wearable device, an indication of the point on the surface, wherein a position of the point is based on the location of the point and a third user view of the real-world scene.

2. The method of claim 1 further comprising:

identifying, by processing the image, the plurality of surfaces within the image, the identifying including determining the plurality of locations for the plurality of surfaces.

3. The method of claim 1 further comprising:

sending the image to a backend computer via a wireless communication link with an instruction for the backend computer to process the image; and receiving the data indicating the plurality of surfaces within the image and the plurality of locations for the plurality of surfaces.

4. The method of claim 1 wherein the location is a first location, the point is a first point, the input is a first input, and the position is a first position, and wherein the method further comprises:

identifying a second location of a second point on the surface of the plurality of surfaces based on second input from the user; and displaying, on the display of the AR wearable device, the second point on the surface, wherein a second position of the second point is based on the second location of the second point and a fourth user view of the real-world scene.

5. The method of claim 4 further comprising:

displaying, on the display of the AR wearable device, a distance between the first point and the second point.

6. The method of claim 4 further comprising:

displaying, on the display of the AR wearable device, a line between the first point and the second point, and a bubble level, the bubble level indicating whether the line is level or plumb.

7. The method of claim 6 further comprising:

adjusting the first location of the first point or the second position of the second point to level or plumb the line between the first point and the second point.

8. The method of claim 6 wherein the line is a first line and wherein the method further comprises:

adjusting the second location of the second point on the surface of the plurality of surfaces based on third input from the user to generate a third location; and displaying, on the display of the AR wearable device, the second point on the surface, wherein a third position of the second point is based on the third location of the second point and a fifth user view of the real-world scene; and displaying, on the display of the AR wearable device, a second line between the first point and the second point, and the bubble level, the bubble level indicating whether the second line is level or plumb.

9. The method of claim 8 further comprising:

identifying, by processing the image, an image of a painting within the image and a third position of the painting, the third position comprising three-dimensional coordinates within a world coordinate system;

resizing the image of the painting in accordance with a change between the third position and a fourth position, wherein the fourth position of the image of the painting is based on the first position of the first point, the second position of the second point, and a sixth user view of the real-world scene; and displaying, on the display of the AR wearable device, the image of the painting at the fourth position on the surface.

10. The method of claim 9 wherein the fourth position is further based on positions of hangers on a back of the painting.

11. The method of claim 9 wherein the image is a first image and wherein the method further comprises:

receiving third user input indicating a movement of the painting along the surface.

12. The method of claim 1 wherein the image is a first image, the data is first data, the plurality of surfaces is a first plurality of surfaces, the plurality of locations is a first plurality of locations, and the method further comprises:

receiving an indication that a movement of the AR wearable device is greater than or transgresses a threshold;

capturing, by the image capturing device of the AR wearable device, a second image corresponding to a fourth user view of the real-world scene;

accessing, in the memory of the AR wearable device, second data indicating a second plurality of surfaces within the image and a second plurality of locations for the second plurality of surfaces; and displaying, on a display of the AR wearable device, indications of the second plurality of surfaces, wherein positions of the indications of the second plurality of surfaces on the display are based on the second plurality of locations of the second plurality of surfaces and a fifth user view of the real-world scene.

13. The method of claim 12 further comprising:

receiving an indication that the movement of the AR wearable device is less than or does not transgress the threshold; and displaying, on a display of the AR wearable device, indications of the plurality of surfaces, wherein positions of the indications of the plurality of surfaces on the display are based on the plurality of locations of the plurality of surfaces and a fifth user view of the real-world scene, wherein the fifth user view is determined based on the movement.

14. An augmented reality (AR) wearable device comprising:

at least one processor; and a memory storing instructions that, when executed by the at least one processor, configure the AR wearable device to perform operations comprising:

capturing, by an image capturing device of the AR wearable device, an image corresponding to a first user view of a real-world scene;

accessing, in a memory of the AR wearable device, data indicating a plurality of surfaces within the image and a plurality of locations for the plurality of surfaces;

displaying, on a display of the AR wearable device, indications of the plurality of surfaces as overlays on the real-world scene, wherein the indications further comprise labels identifying surfaces of the plurality of surfaces and three-dimensional geometric representations including at least one cuboid overlaid on at least one surface of the plurality of surfaces, wherein positions of the indications of the plurality of surfaces on the display are based on the plurality of locations of the plurality of surfaces and a second user view of the real-world scene;

identifying a location of a point on a surface of the plurality of surfaces based on input from a user; and displaying, on the display of the AR wearable device, an indication of the point on the surface, wherein a position of the point is based on the location of the point and a third user view of the real-world scene.

15. The AR wearable device of claim 14 wherein the operations further comprise:

identifying, by processing the image, the plurality of surfaces within the image, the identifying including determining the plurality of locations for the plurality of surfaces.

16. The AR wearable device of claim 14 wherein the operations further comprise:

sending the image to a backend computer via a wireless communication link with an instruction for the backend computer to process the image; and receiving the data indicating the plurality of surfaces within the image and the plurality of locations for the plurality of surfaces.

17. The AR wearable device of claim 14 wherein the location is a first location, the point is a first point, the input is a first input, and the position is a first position, and wherein the operations further comprise:

identifying a second location of a second point on the surface of the plurality of surfaces based on second input from the user; and displaying, on the display of the AR wearable device, the second point on the surface, wherein a second position of the second point is based on the second location of the second point and a fourth user view of the real-world scene.

18. The AR wearable device of claim 17 wherein the operations further comprise:

displaying, on the display of the AR wearable device, a distance between the first point and the second point.

19. A non-transitory computer-readable storage medium, the computer-readable storage medium including instructions that when executed by an augmented reality (AR) wearable device, cause the AR wearable device to perform operations comprising:

capturing, by an image capturing device of the AR wearable device, an image corresponding to a first user view of a real-world scene;

accessing, in a memory of the AR wearable device, data indicating a plurality of surfaces within the image and a plurality of locations for the plurality of surfaces;

displaying, on a display of the AR wearable device, indications of the plurality of surfaces as overlays on the real-world scene, wherein the indications further comprise labels identifying surfaces of the plurality of surfaces and three-dimensional geometric representations including at least one cuboid overlaid on at least one surface of the plurality of surfaces, wherein positions of the indications of the plurality of surfaces on the display are based on the plurality of locations of the plurality of surfaces and a second user view of the real-world scene;

identifying a location of a point on a surface of the plurality of surfaces based on input from a user; and displaying, on the display of the AR wearable device, an indication of the point on the surface, wherein a position of the point is based on the location of the point and a third user view of the real-world scene.

20. The non-transitory computer-readable storage medium of claim 19 wherein the identifying further comprises:

identifying, by processing the image, the plurality of surfaces within the image, the identifying including determining the plurality of locations for the plurality of surfaces.

* * * * *